United States Patent [19]

Tominaga et al.

[11] Patent Number: 4,729,354

[45] Date of Patent: Mar. 8, 1988

[54] FUEL SUPPLY CONTROL SYSTEM FOR USE IN ENGINE

[75] Inventors: Hideki Tominaga, Higashi-Hiroshima; Kazuya Takaki, Hiroshima, both of Japan

[73] Assignee: Mazda Motor Corporation, Hiroshima, Japan

[21] Appl. No.: 20,736

[22] Filed: Mar. 2, 1987

[30] Foreign Application Priority Data

Mar. 5, 1986 [JP] Japan .................................. 61-46346

[51] Int. Cl.$^4$ ............................................. F02D 41/12
[52] U.S. Cl. ..................................... 123/320; 123/493
[58] Field of Search ........................ 123/320, 361, 493

[56] References Cited

U.S. PATENT DOCUMENTS

| | | | |
|---|---|---|---|
| 4,305,365 | 12/1981 | Iizuka et al. | 123/493 |
| 4,445,603 | 5/1984 | Filsinger | 123/361 |
| 4,628,883 | 12/1986 | Kataoka | 123/493 |
| 4,640,243 | 2/1987 | Abo et al. | 123/361 |
| 4,644,923 | 2/1987 | Morita et al. | 123/493 |
| 4,671,240 | 6/1987 | Yamato | 123/493 |

FOREIGN PATENT DOCUMENTS

| | | |
|---|---|---|
| 52-18535 | 2/1977 | Japan . |
| 58-217736 | 12/1983 | Japan . |
| 58-222930 | 12/1983 | Japan . |
| 59-200026 | 11/1984 | Japan . |

*Primary Examiner*—William A. Cuchlinski, Jr.
*Attorney, Agent, or Firm*—Wenderoth, Lind & Ponack

[57] ABSTRACT

A fuel supply control system for use in an engine includes a feeder for supplying fuel to the engine in an amount suitable for operating conditions of the engine, a detector for detecting a decelerating state of the engine, and a correcting device for, upon detecting the deceleration, increasing a rate of fuel supply so that combustion may be stabilized to prevent car-bucking. The system further includes a brake detector for detecting an operative state of a brake device of the vehicle, and a limiter for, upon operation of the brake device, limiting the increase of fuel supply whereby the fuel consumption efficiency can be improved. During operation of the break device, car-bucking is restricted by a braking force so that substantially no vibration is transmitted to a driver.

10 Claims, 5 Drawing Figures

FUEL SUPPLY CONTROL SYSTEM FOR USE IN ENGINE

BACKGROUND OF THE INVENTION

1. Field of the Invention

The present invention relates to a fuel supply control system for use in an internal combustion engine and, more particularly, to a fuel control system of a type which is intended to increase a rate of fuel supply to the engine during an operative state where it is driven at a low rotational speed during a deceleration of a vehicle.

2. Description of the Prior Art

As is well known, a so-called car-bucking phenomenon (hereinafter referred to as car-bucking) which represents a physical phenomenon that a high intensity of vibration in the form of rattling movement of a vehicle, is experienced under such an operative condition that start of movement, deceleration and stoppage of movement are frequently repeated for a comparatively short period of time due to a traffic jam or like reason. This causes a driver to experience an unpleasant feeling.

There are various factors causing car-bucking, one of which is such that failure of ignition in a combustion chamber tends to occur under the above-mentioned operative condition due to the fact that the engine is driven at a low rotational speed and thereby a charging efficiency of fuel is reduced particularly during a deceleration of the vehicle, i.e. when a throttle valve is closed.

Further, as discussed in Japanese Patent Laid-Open (KOKAI) document No. 18535/77, an engine provided with an electronic control type fuel injection device has a problem that an air-fuel ratio varies also due to overshooting of an air flow meter, resulting in unstable combustion of the engine that causes the car-bucking.

In order to prevent the above disadvantage, it has been found effective to increase a rate of fuel supply to the engine during the deceleration so as to stabilize the combustion, as disclosed in the above prior art document. A similar concept is also disclosed in Japanese Patent Laid-Open documents No. 217736/83, No. 222930/83 and No. 200026/84. This solution of increasing the fuel supply as disclosed in these prior art documents is, however, still insufficient in view of a fuel consumption efficiency which is one of the most significant technical concerns in modern engines for vehicles. Particularly in an electronic controlled fuel supply system, various operating conditions of the engine are detected by sensors and fuel supply is very carefully controlled so as to reflect the detected conditions. By simply increasing the fuel supply for preventing car-bucking the fuel consumption efficiency is apparently reduced. This is particularly remarkable when the deceleration of the vehicle is repeated with the engine being driven at a low rotational speed, as experienced in a traffic jam.

Therefore, an object of the present invention is to provide a fuel supply control system for use in an internal combustion engine which can improve a fuel consumption efficiency while preventing an occurance of car-bucking.

SUMMARY OF THE INVENTION

According to the present invention, a fuel supply control system for use in an engine comprises means for supplying fuel to the engine in an amount suitable for operating conditions of the engine, means for detecting a decelerating state of the engine, means for incresing a rate of fuel supply by the supply means when the decelerating state is detected by the deceleration detecting means, means for detecting an operative state of a brake device mounted on a vehicle, and means for limiting the increase in rate of fuel supply by the increasing means when the operative state of the brake device is detected by the brake detecting means.

By the term "limiting" is meant either releasing the increase or reducing a rate of increase.

With the above arrangement, when the brake device is in the operating state during the deceleration, a fuel supply is not substantially increased, that is, a normal amount of fuel determined by the supply means is fed to the engine. In consequence, fuel consumption efficiency is improved in contrast with the case where an increase in the rate of fuel supply is always performed during the deceleration. On the other hand, when it is found that the brake device is not in the operative state, an increase in the rate of fuel supply is carried out by the increasing means during the deceleration so that car-bucking can be prevented without fail.

When the brake device is operated, a body of the vehicle is restrained under the effect of the braking force. Thus, even if there occurs fluctuation in rotation of the engine due to repetition of ignition and failure, resulting vibration or rattling movement is constrained by the braking force to reduce the fluctuation and therefore is hardly transmitted to a driver.

DESCRIPTION OF THE PREFERRED EMBODIMENTS

Figure 1:
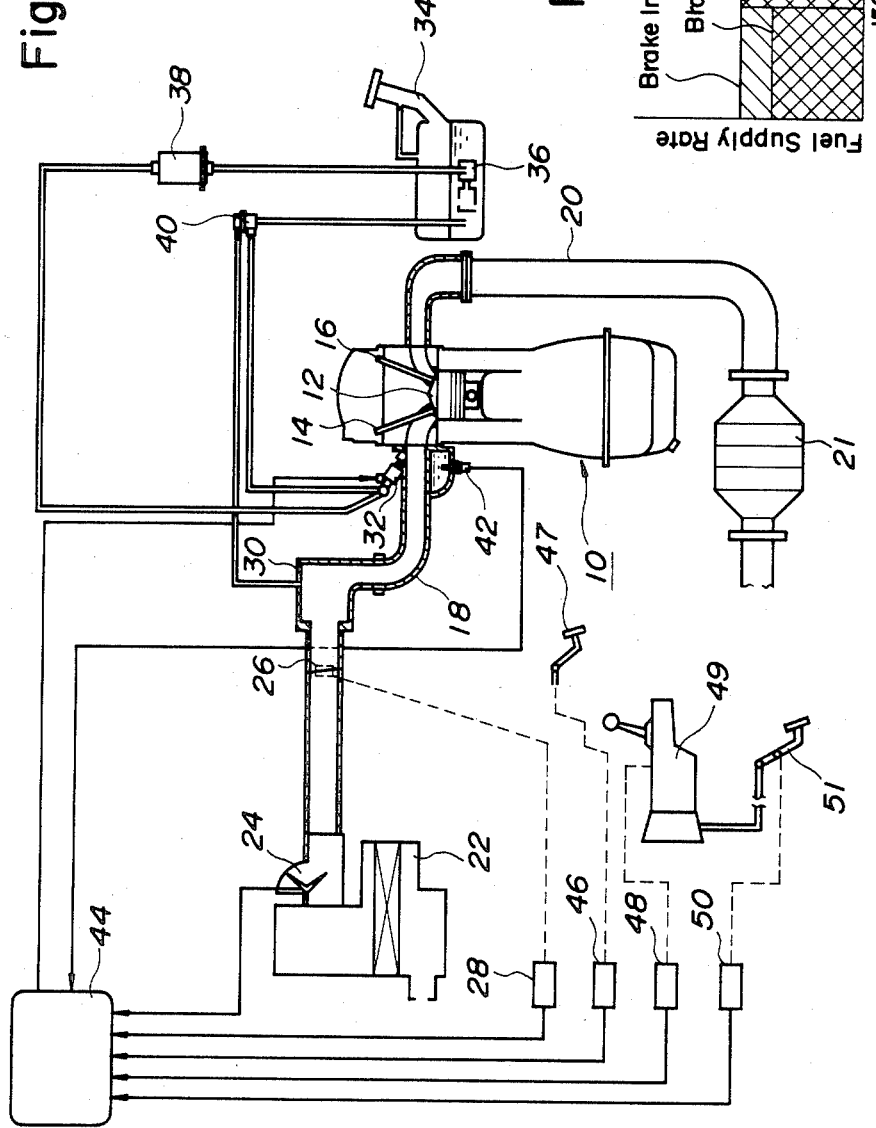
FIG. 1 is a schematic view illustrating a system according to the present invention.

Referring now to FIG. 1 of the drawings, there is shown a fuel supply control system according to an embodiment of the invention and adapted to be used in an engine having an electronic controlled fuel injection. The engine 10 includes a combustion chamber 12 which is communicated with an intake pipe 18 via a suction valve 14 as well as an exhaust pipe 20 via an exhaust valve 16. A catalytic converter 21 is disposed at a certain position in the exhaust pipe 20 to purify the exhaust gas from the combustion chamber 12. An air cleaner 22 for cleaning intake air is disposed at the upstream end of the intake pipe 18, and an air flow meter 24 is provided at a position downstream of the air cleaner 22 to measure a flow rate of such intake or suction air. An output signal of the air flow meter 24 is in the form of voltage. A throttle valve 26 for adjusting a flow rate of the suction air is disposed at a position downstream of the air flow meter 24. The fully closed state of the throttle valve 26 is detected by an idle switch 28. After a flow rate of suction air is properly adjusted by means of the throttle valve 26, the air is delivered into the combustion chamber 12 through a surge tank 30 which is located downstream of the throttle valve 26.

A fuel injection valve 32 for supplying fuel into the interior of the combustion chamber 12 via the intake valve 14 is disposed adjacent the downstream end of the intake pipe 18. Fuel stored in a fuel tank 34 is delivered to the fuel injection valve 32 by a fuel pump 36 through a fuel filter 38. To adjust fuel injection pressure a regulator 40 is operatively connected to the fuel injection valve 32.

The amount of fuel to be supplied into the interior of the engine 10 via the fuel injection valve 32 is properly controlled with the aid of a control unit 44 into which various parameters such as flow rate of suction air from the air flow meter 24, cooling water temperature detected by a water temperature sensor 42, number of revolutions of the engine measured by an appropriate sensor (not shown) on the engine 10, are inputted in the form of electrical signals to calculate a rate of fuel supply suitable for the existent operating state of the engine 10, as is well known in the art.

Further connected to the control unit 44 are a brake switch 46 that is connected to a foot brake 47 to detect operative ("ON") and non-operative ("OFF") states thereof, a neutral switch 48 connected to a transmission gear 49 for detecting the neutral position ("ON") thereof, and a clutch switch 50 connected to a clutch pedal 51 for detecting the disengaged state ("ON") of the clutch.

The control unit 44 comprises a so-called micro-computor and includes an interface for enabling communication between the control unit 44 and a group of sensors such as air flow meter 24, water temperature sensor 42 and others, a group of switches such as idle switch 28, brake switch 46 and others and the fuel injection valve 32. The unit 44 further includes a storage device (ROM, RAM) in which a fuel supply control program is stored, and a central processing unit. In addition to calculation of a rate of fuel supply as is already known, fuel supply controlling as illustrated in FIG. 2 is effected in the control unit 44.

Figure 2:
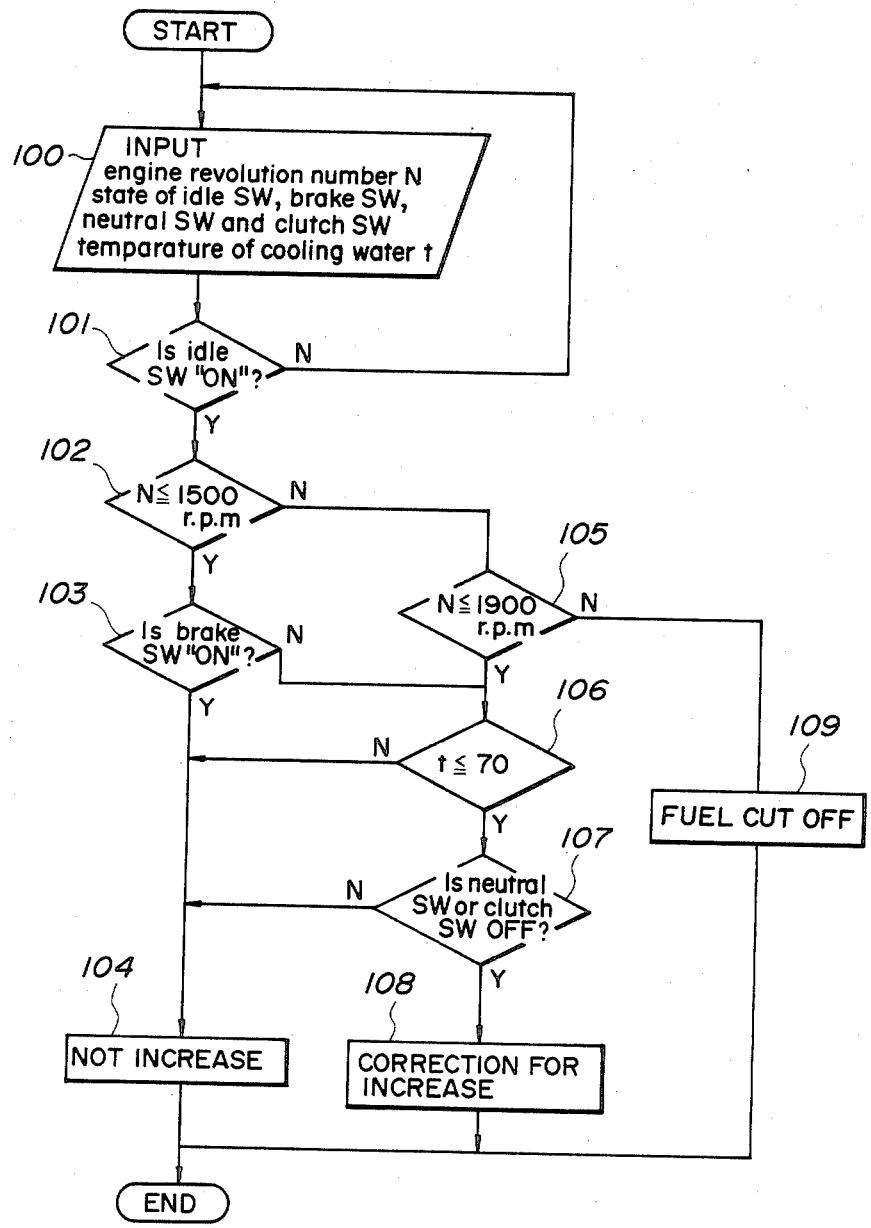
FIG. 2 illustrates a flow chart of a sequence of steps for carrying out a fuel supply control according to an embodiment of the invention.

According to a program sequence shown in FIG. 2, when the engine 10 starts its operation, the existent state of the idle switch 28, the brake switch 46, the neutral switch 48 and the clutch switch 50, the temperature t of the cooling water and the number of revolutions N of the engine are inputted into the control unit 44 at Step 100.

Next, determination is made at Step 101 as to whether the idle switch 28 is actuated ("ON") or not ("OFF"). When it is found that the idle switch 28 is ON which means that the throttle valve 26 is fully closed, the program runs Step 102. At Step 102 it is determined as to whether or not the number of revolutions of the engine is less than a preset value (which is preset to 1,500 r.p.m. in the illustrated embodiment). When it is found less than the preset number of revolutions of the engine, the program goes to Step 103 to check whether the brake switch 46 is ON or OFF.

When it is found at Step 103 that the brake switch is ON which indicates that the brake device is being operated by a driver, the program immediately goes to Step 104 in which is executed an instruction not to increase a rate of fuel supply, that is, not to correct a value calculated on the basis of the various parameters as discussed above. This release of increase is based on the following reason. If the brake switch 46 is ON, a body of the vehicle is restrained under the effect of braking force generated by the brake device. Thus, even though there occurs fluctuation in rotation of the engine due to repetition of ignition and failure, resulting vibration or rattling movement is constrained by the braking force to reduce the fluctuation and therefore is hardly transmitted to a driver.

On the other hand, when it is determined at Step 103 that the brake switch 46 is OFF, the program goes to Step 106 in order to check whether or not the water temperature sensor 42 detects a temperature higher than 70° C. When it detects a temperature higher than 70° C., the program runs Step 104 whereby no increase in rate of fuel supply is carried out. This is because warming-up of the engine has already been completed when the water temperature t is higher than 70° C. and it is no longer necessary to increase a rate of fuel supply for preventing the car-bucking.

When it is found at Step 106 that water temperature t is lower than 70° C., it is checked at Step 107 whether the neutral switch 48 and the clutch switch 50 are ON or OFF. If the neutral switch 48 is ON which indicates that transmission gear 49 is in the neutral position, or if the clutch switch 50 is ON which means the disengaged state of the clutch, Step 104 is executed not to increase a rate of fuel supply as in the above case. The body is operatively separated from the engine when the neutral switch 48 or the clutch switch 50 is ON. Therefore, no vibration is transmitted to the driver even though release of increase involves fluctuation in rotation of the engine.

If the neutral switch 48 and the clutch switch 50 are found OFF at Step 107, then Step 108 is executed whereby a normal value calculated by the control unit 44 as discussed above is corrected to increase the fuel supply so that combustion of the engine can be stabilized even during the deceleration for preventing the car-bucking.

At Step 102, when it is determined that the number of revolutions N of the engine is higher than 1,500 r.p.m., the program runs Step 105 where determination is made as to whether the number N is lower than a certain value which is preset at a level higher than the value set in Step 102. In this embodiment, it is preset to 1,900 r.p.m. If the number N is found between 1,500 r.p.m. and 1,900 r.p.m., the program goes to Step 106 in order to determine whether or not an increase of fuel supply is to be carried out on the basis of water temperature t and the states of the neutral switch 48 and clutch switch 50. On the other hand, if the number N is found at Step 105 higher than 1,900 r.p.m., Step 109 is executed whereby the fuel supply is cut off during the deceleration.

Figure 3:
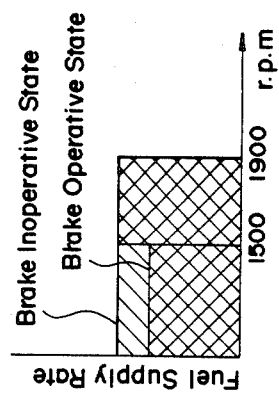
FIG. 3 is an explanatory diagram showing an amount of fuel supply.

FIG. 3 illustrates a relation between fuel supply rate and engine revolution number N during Steps 100 to 104 at which controlling for fuel supply is effected, as described above with reference to FIG. 2. As will be apparent from the diagram, controlling is effected in the range between idle revolution number (1,000 r.p.m.) and 1,500 r.p.m. of the engine in such a manner that no increase in rate of fuel supply is carried out only when a foot pedal (brake device) is actuated. It should be noted here that the number of revolutions N, below which the increase releasing control is effected according to the invention, may be any optional number and is not limited to 1,500 r.p.m. as in the illustrated embodiment.

In the above embodiment, increase of fuel supply is completely released when the brake switch 46 is ON. It is possible, however, to reduce a rate of the increase during the ON state of the brake switch.

Figure 4:
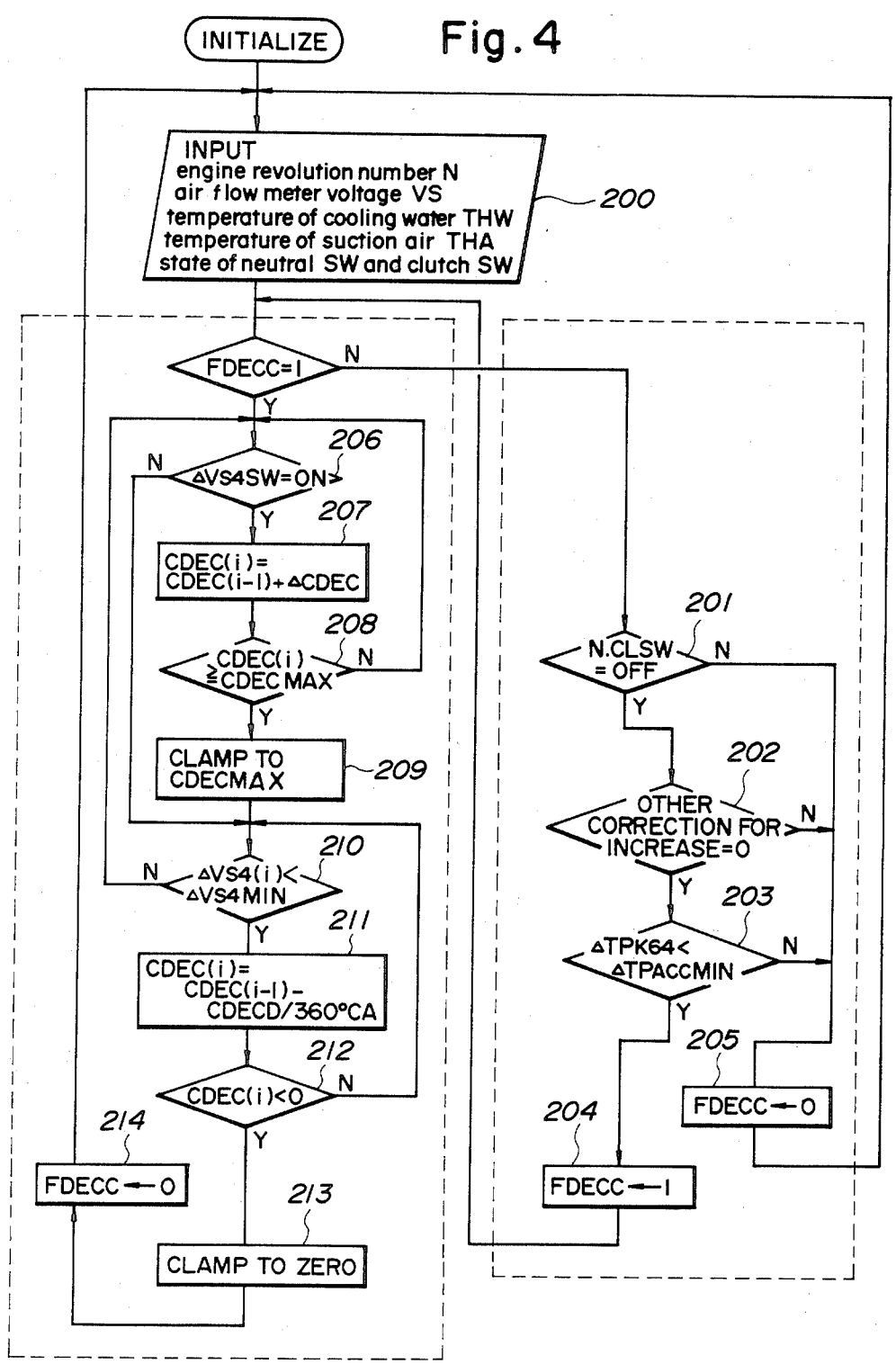
FIGS. 4 and 5 are flow charts of sequences of steps for carrying out a fuel supply control according to another embodiment of the invention.
Figure 5:
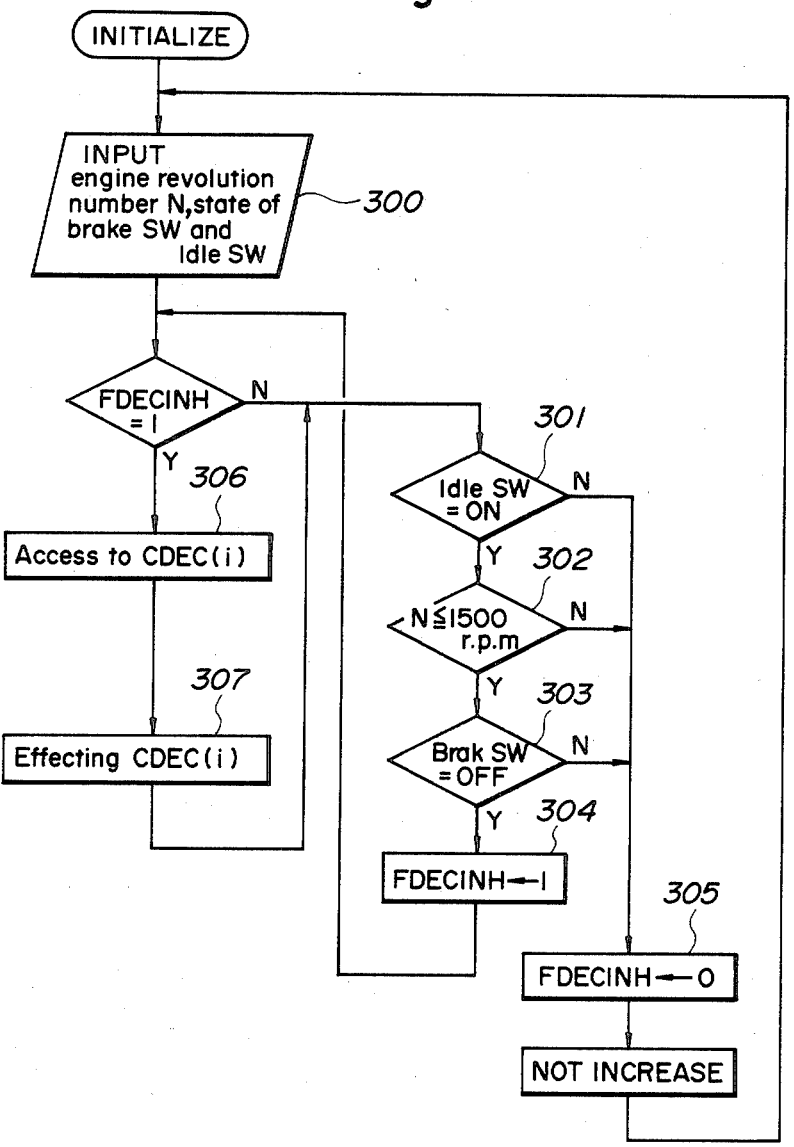

Reference will be made to another embodiment of FIGS. 4 and 5 in which are illustrated program sequences for controlling fuel supply during the decelerating state of the vehicle. FIG. 4 generally shows the program sequence for determining whether calculation to increase fuel supply is necessary (right-hand side in FIG. 4) and for calculating a corrected value of fuel supply (left-hand side), while FIG. 5 shows a sequence of steps for determining whether the increase should actually be effected through the injection valve 32. The sequence of FIG. 4 and the sequence of FIG. 5 are performed concurrently.

Initially, flag for executing a calculation to increase fuel supply (FDECC), corrected value for the increase (CDEC(i)) and flag for effecting the increase (FDECINH) are all set to 0. Next, various parameters are inputted into the control unit 44 at Steps 200 and 300, the parameters being number of revolutions N, output voltage from the air flow meter 24 (VS), temperature of cooling water (THW), temperature of suction air (THA) and ON or OFF states of the neutral switch 48 and clutch switch 50 (FIG. 4), and number of revolutions N, state of the brake switch 46 and state of the idle switch 28 (FIG. 5).

Referring to FIG. 4, the program first goes to Step 201 as FDECC is set to 0. If the neutral switch and clutch switch are found OFF at Step 201, it is checked at Step 202 as to whether the fuel supply is being increased for warming-up of the engine, increased just after start or the like. When no increase is found, Step 203 is executed to determine whether the vehicle is not in an accelerated state, this determination being achieved by comparing $\Delta TPK64$ with $\Delta TPACCMIN$ wherein $\Delta TPK64$ (i) is calculated by the following expressions:

$$TP = (VS/N) \times K$$

(this means a normal fuel injection rate per one revolution)

$$TPK = TP \times CK$$

$$TPK64 (i) = \{63 \times TPK64 (i-1) + TPK\}/64$$

$$\Delta TPK64 (i) = TPK - TPK64 (i)$$

If $\Delta TPK64$ is found smaller than $\Delta TPACCMIN$ which is preset to 0.2 m/s, Step 204 is executed to output a signal corresponding to 1 to FDECC whereby operation is started to calculate CDEC (i). On the other hand, if the program goes to Step 205 from any of the above Steps 201 to 203, it returns to Step 200.

The first step for calculating CDEC (i) is to check whether the vehicle is in the decelerated state. This check is executed at Step 206 by checking if $\Delta VS4$ switch is ON which indicates that an alteration of VS is more than a preset value (0.24 v. in this example). When determined as deceleration, CDEC (i) is calculated by Steps 207 to 209 wherein $\Delta CDEC$ is preset to 1.95% and CDECMAX is 10%, for example. When $\Delta VS4$ switch is OFF at Step 206, or when CDEC (i) is clamped to the maximum value at Step 209, $\Delta VS4$ (i) is compared with $\Delta VS4MIN$ preset, for example, to 0.08 v. (Step 210). $\Delta VS4$ (i) is calculated by the following expressions:

$$VS4 (i) = \{VS + 3VS4 (i-1)\}/4$$

$$\Delta VS4 (i) = VS4 (i-1) - VS$$

If $\Delta VS4$ (i) is found larger than $\Delta VS4MIN$, the program returns to Step 206. On the other hand, if the determination at Step 210 is "YES", operation is made to decrease CDEC (i) per one revolution of the engine, i.e. per 360° of crank angle, at Step 211 wherein CDECD is a preset value (0.1% for example). Steps 210 and 211 are repeated by Step 212 until CDEC (i) becomes lower than 0. When it is clamped to 0 at Step 213, a subsequent Step 214 is executed to output a signal corresponding to 0 to FDECC and the program returns to Step 200.

Referring to FIG. 5, the program sequence for effecting the increase first goes to Step 301 as FDECINH is set to 0. If it is determined that the idle switch 28 is ON (Step 301), that number of revolutions N is less than 1,500 r.p.m. for example (Step 302), and that the brake switch 46 is OFF (Step 303), a signal corresponding to 1 is outputted at Step 304 to FDECINH. Therefore, Step 306 is executed to access CDEC (i) which is then reflected to the injection valve 32 at Step 307, that is to say, the normal, basic fuel supply rate TP as discussed above is corrected for increase by CDEC (i). On the other hand, if in any of Steps 301 to 303 determination is NO, the program goes to Step 305 to output a signal corresponding to 0 to FDECINH so that it returns to Step 300 without executing Steps 306 and 307.

It is to be noted that although in the above embodiments the fuel control system has been described as used in the fuel injection device, the system of the invention may of course be applicable to a carburetor-type engine.

As is apparent from the above description, since the increase in rate of fuel supply during deceleration is interrupted when the brake device is actuated where, the car-bucking is not serious. Therefore, present invention can improve fuel consumption efficiency when compared with the known system in which the increase of fuel supply during deceleration is performed regardless of the brake device. The improvement of fuel supply efficiency is particularly remarkable when the vehicle runs in a traffic jam.

Although the invention has been described with reference to the preferred embodiments thereof, many modifications and alterations may be made within the spirit of the present invention.

What is claimed is:

1. A fuel supply control system for use in an engine comprising:
    means for supplying fuel to the engine in an amount suitable for operating conditions of the engine;
    means for detecting a decelerating state of the engine;
    means for increasing a rate of fuel supply by said supply means when the decelerating state is detected by said deceleration detecting means;
    means for detecting an operative state of a brake device mounted on a vehicle; and
    means for limiting said increase in rate of fuel supply by said increasing means when the operative state of the brake device is detected by said brake detecting means.

2. A system as claimed in claim 1, wherein said fuel supply increasing means includes means for detecting an engagement between an output shaft of the engine and a driving wheel of the vehicle and for limiting said increase in rate of fuel supply when disengagement is detected.

3. A system as claimed in claim 1, wherein said fuel supply increasing means includes means for detecting the number of revolutions of the engine and for limiting said increase in rate of fuel supply when the number of revolutions is higher than a predetermined value.

4. A system as claimed in claim 1, wherein said fuel supply increasing means includes means for measuring a temperature of cooling water circulating in the engine and for limiting said increase in rate of fuel supply when the temperature is higher than a predetermined value.

5. A fuel supply control system for use in an engine comprising:
   means for supplying fuel to the engine in an amount suitable for operating conditions of the engine;
   means for detecting a fully closed state of a throttle valve disposed in an intake pipe of the engine;
   means for detecting an engagement between an output shaft of the engine and a driving wheel of a vehicle;
   means for increasing a rate of fuel supply by said supply means when said throttle valve is found to be fully closed by said closed state detecting means and when said engagement detecting means detects the engaging state between said output shaft and said driving wheel;
   means for detecting an operative state of a brake device mounted on the vehicle; and
   means for limiting said increase in rate of fuel supply by said increasing means when the operative state of the brake device is detected by said brake detecting means.

6. A system as claimed in claim 5, wherein said closed state detecting means comprises an idle switch connected to said throttle valve.

7. A system as claimed in claim 5, further comprising means for measuring a flow rate of suction air and for detecting a deceleration of the vehicle based on a reduction of the flow rate of the suction air, and wherein said fuel supply increasing means includes means for adjusting a rate of increase in cooperation with said flow rate measuring means.

8. A system as claimed in claim 5, wherein said fuel supply increasing means includes means for detecting the number of revolutions of the engine and for limiting said increase in rate of fuel supply when the number of revolutions is higher than a predetermined value.

9. A system as claimed in claim 5, wherein said fuel supply increasing means includes means for measuring a temperature of cooling water circulating in the engine and for limiting said increase in rate of fuel supply when the temperature is higher than a predetermined value.

10. A system as claimed in claim 5, wherein said fuel supply increasing means includes means for checking the state of said supply means and for limiting said increase in rate of fuel supply when said supply means has already carried out the increase other than by the deceleration.

* * * * *